(12) United States Patent
Liu et al.

(10) Patent No.: US 9,845,249 B2
(45) Date of Patent: Dec. 19, 2017

(54) METHOD FOR PREPARATION OF MORDENITE

(71) Applicant: China University of Petroleum-Beijing, Beijing (CN)

(72) Inventors: Haiyan Liu, Beijing (CN); Xinyan Sun, Beijing (CN); Xiaojun Bao, Beijing (CN); Gang Shi, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 206 days.

(21) Appl. No.: 14/902,423

(22) PCT Filed: Dec. 2, 2013

(86) PCT No.: PCT/CN2013/088287
§ 371 (c)(1),
(2) Date: Mar. 28, 2016

(87) PCT Pub. No.: WO2015/000254
PCT Pub. Date: Jan. 8, 2015

(65) Prior Publication Data
US 2016/0207787 A1   Jul. 21, 2016

(30) Foreign Application Priority Data
Jul. 3, 2013 (CN) .......................... 2013 1 0276973

(51) Int. Cl.
*C01B 39/26* (2006.01)
(52) U.S. Cl.
CPC ............ *C01B 39/265* (2013.01); *C01B 39/26* (2013.01)
(58) Field of Classification Search
CPC ............................... C01B 39/26; C01B 39/265
See application file for complete search history.

(56) References Cited

U.S. PATENT DOCUMENTS

| | | | | |
|---|---|---|---|---|
| 5,935,551 A | * | 8/1999 | Davis | ...................... C01B 39/02 423/700 |
| 6,150,292 A | * | 11/2000 | Merlen | ..................... B01J 29/20 502/64 |
| 2016/0221832 A1 | * | 8/2016 | Lai | ......................... C01B 39/265 |

FOREIGN PATENT DOCUMENTS

| | | |
|---|---|---|
| CN | 1243100 | 2/2000 |
| CN | 101033070 | 9/2007 |

(Continued)

OTHER PUBLICATIONS

International Search Report dated Apr. 3, 2014 corresponding to International Application No. PCT/CN2013/088287; 3 pages.

(Continued)

*Primary Examiner* — David M Brunsman
(74) *Attorney, Agent, or Firm* — Ohandt, Greeley, Ruggiero & Perle, LLP (57) ABSTRACT

The present invention provides a method for preparing a mordenite, which is a method for preparing the mordenite through a hydrothermal crystallization by using natural aluminosilicate minerals as total silicon sources and total aluminum sources, comprising the steps of: subjecting the natural aluminosilicate minerals to activation treatment which is an activation by sub-molten salt and an activation by thermal treatment; selecting and mixing the activated natural aluminosilicate minerals according to the silicon-to-aluminum ratio of the targeted mordenite, adding thereto deionized water, sodium hydroxide, crystal seed, a templating agent to obtain a reaction mixture; adjusting the reaction mixture by using an inorganic acid to have a pH of 10-13, and then aging it at 40-80° C. for 6-24 hours; and subjecting the aged reaction mixture to hydrothermal crystallization, and then filtering, washing, drying and calcinating the crystallized product to obtain the mordenite. The method for preparing a mordenite provided in the present invention (Continued)

enlarges the sources of raw materials for a molecular sieve, has a low cost and a simple process route, and can largely reduce the cost for synthesizing a molecular sieve.

13 Claims, 6 Drawing Sheets

(56) References Cited

FOREIGN PATENT DOCUMENTS

| CN | 102060309 | 5/2011 |
|---|---|---|
| CN | 102602958 | 7/2012 |
| CN | 102974392 | 3/2013 |
| CN | 103043679 | 4/2013 |
| SU | 1407904 | 7/1988 |

OTHER PUBLICATIONS

Second Chinese Office Action dated Apr. 14, 2016 from corresponding Chinese Application No. 201310276973.3.
Chinese Office Action dated Sep. 25, 2015 corresponding to Chinese Application No. 201310276973.3; 9 pages.
Kim G.J., Ahn W.S. Direct synthesis and characterization of high-Sio2-content mordenites. Zeolites, 1991,11, 745-750.
Synthesis and Characterization of Mordenites with Mesoporous Structures, Journal of the Chinese Cearmic Society, vol. 40, No. 3 (Mar. 2012) pp. 425-431.

\* cited by examiner

METHOD FOR PREPARATION OF MORDENITE

This application is a 371 filing of PCT/CN2013/088287, filed Dec. 2, 2013.

TECHNICAL FIELD

The present invention relates to a method for preparing a mordenite, which belongs to a synthesis technique for a molecular sieve.

BACKGROUND

A mordenite (MOR) type molecular sieve ($Na_8[(Al_8Si_{40})O_{96}]\cdot 24H_2O$), which pertains to the orthorhombic system having a space group of Cmcm and lattice parameters of a=18.3 Å, b=20.5 Å, c=7.5 Å and has a tunnel structure of [001] 12 6.5 Å×7.0 Å-[010] 8 3.4 Å×4.8 Å-[001] 8 2.6 Å×5.7 Å, is one kind of the important catalytic and adsorption-separation materials, as applied widely in the petroleum processing and fine chemistry industries such as xylene isomerization, transalkylation, toluene disproportionation and selective hydrogenation of olefins.

The prior-art MOR type molecular sieves are generally prepared through a conventional hydro-thermal synthesis process in a system with high alkalinity, by providing a silicon source by silica powders, sodium silicate, silica sols or the like, and providing an aluminum source by sodium metaaluminate, aluminum sulfate or the like.

A MOR type molecular sieve is synthesized using sodium aluminate (32.6 wt % $Na_2O$, 35.7 wt % $Al_2O_3$) and $SiO_2$ powders as raw materials at a molar ratio of $6Na_2O:Al_2O_3:30SiO_2:780H_2O$ by Kim and Ahn (Kim G J., Ahn W. S. Direct synthesis and characterization of high-$SiO_2$-content mordenites. Zeolites, 1991, 11, 745-750), which is characterized by XRD to have main peaks at d=3.45, 3.97, 9.02, 3.27 and 3.21 Å and have a composition, as the product, of $Na_2O:Al_2O_3:17.2SiO_2$.

CN 88100228A discloses a method for synthesizing a mordenite in non-aqueous systems, which uses water glass and aluminum sulfate as silicon and aluminum sources and an organic phase as a dispersion medium, and comprises firstly synthesizing a aluminosilicate gel in an oriented manner, then dispersing the gel into an organic medium, and subjecting the dispersion to polycondensation, nucleatation and further crystallization to produce the mordenite.

CN 1050011A discloses a method for synthesizing a high-silicon mordenite, comprising directly synthesizing a high-silicon mordenite having a $SiO_2$-to-$Al_2O_3$ ratio of 15-30 under the presence of ammonia with water glass, an inorganic acid/base and an aluminum salt or aluminate as raw materials.

CN 1463921A discloses a method for synthesizing a high-silicon mordenite, comprising producing a mordenite in a hydro-thermal synthesis at 110-230° C. with salts or oxides of silicon and aluminum, and hydroxides of an alkali metal as raw materials and a neutral substance, caprolactam, as a templating agent.

Although the technologies for synthesizing a molecular sieve with chemical agents as raw materials are well-developed, the chemical agents such as water glass, sodium silicate and aluminum sulfate are generally derived from natural silicon-containing or aluminum-containing minerals through complicated processes, which associated with huge waste generation and extensive energy consumption. Therefore, direct synthesis of a molecular sieve from natural aluminosilicate and silicate minerals through a "green" method can not only shorten the synthesis route, but also widen the sources for synthesizing a molecular sieve due to the various types and plentiful reserves of natural silicon and aluminum minerals.

Currently, the reports of synthesizing a molecular sieve with natural aluminosilicate minerals as raw materials are mainly focused on Y and ZSM-5 zeolites which synthesized with natural kaolin as raw materials. There are also reports on studies for preparing a molecular sieve with natural aluminosilicate minerals, such as montmorillonite or diatomaceous earth, as raw materials.

However, when a molecular sieve is synthesized with natural aluminosilicate minerals such as kaolin, rectorite, diatomaceous earth or montmorillonite as raw materials, the natural aluminosilicate minerals mostly have to be activated by high-temperature calcination having a temperature of 600-1000° C., which is a high energy-consumed activation process.

SUMMARY OF THE INVENTION

In order to solve the above technical problem, it is an objective of the present invention to provide a method for preparing a mordenite, comprising synthesizing the mordenite through a hydrothermal crystallization by using highly active natural aluminosilicate and silicate minerals to provide total silicon sources and total aluminum sources for the synthesis of zeolite without adding additional chemical silicon and/or aluminum agents.

To achieve the above objective, the present invention provides a method for preparing a mordenite, which is a method for synthesizing the mordenite through a hydrothermal crystallization by using natural aluminosilicate and silicate minerals as total silicon sources and total aluminum sources without adding chemical silicon and/or aluminum agents, comprising the steps of:

subjecting the natural aluminosilicate and silicate minerals to activation which is a sub-molten salt activation and/or a thermal treatment activation;

selecting and mixing the activated natural aluminosilicate and silicate minerals according to the silicon-to-aluminum ratio of the targeted mordenite, adding thereto deionized water, sodium hydroxide, crystal seed, a templating agent (wherein the deionized water and sodium hydroxide are necessarily added, while the crystal seed and the templating agent are optional) to obtain a reaction mixture having a composition by mole of $SiO_2:Al_2O_3=10\text{-}40:1$, $H_2O:SiO_2=30\text{-}90:1$, $Na_2O:SiO_2=0.1\text{-}0.4:1$, and the templating agent: $SiO_2=0\text{-}0.6:1$ (wherein the amount of silicon source is expressed in terms of $SiO_2$, the amount of aluminum source is expressed in terms of $Al_2O_3$, the amount of sodium hydroxide is expressed in terms of $Na_2O$, and the amount of water is expressed in terms of $H_2O$), in which the crystal seed is added in amount of 0-10 wt % based on the total mass of the reaction mixture;

adjusting the reaction mixture by using an inorganic acid to have a pH of 10-13, and then aging it at 40-80° C. for 6-24 hours; and where the templating agent (also referred to as an organic directing agent) is not added, subjecting the aged reaction mixture to hydrothermal crystallization, and then filtering, washing and drying the crystallized product to obtain the mordenite; and where the templating agent is added, subjecting the aged reaction mixture to hydrothermal crystallization, and then filtering, washing, drying and calcinating the crystallized product to obtain the mordenite.

In the above preparing method, preferably, the natural aluminosilicate minerals as used include one of kaolin, rectorite, montmorillonite, illite, perlite and bentonite, or combinations of more than one members thereof, and the natural silicate minerals include one of diatomaceous earth and white carbon black, or combinations thereof, wherein the one of diatomaceous earth and white carbon black, or combinations thereof are used as a portion of the silicon sources, and the one of kaolin, rectorite, montmorillonite, illite, perlite and bentonite, or combinations of more than one members thereof are used as a portion of the silicon sources and total aluminum sources.

When the natural aluminosilicate minerals such as kaolin, rectorite, diatomaceous earth and montmorillonite are activated by high-temperature calcination, the high-temperature calcination can only destroy $AlO_6$ octahedral layers in the natural aluminosilicate minerals while $SiO_4$ tetrahedral layers are mostly retained. Thus, when natural aluminosilicate minerals activated by high-temperature calcination are used as raw materials, the natural aluminosilicate minerals can only provide a portion of silicon and aluminum sources required for the synthesis of a molecular sieve; in particular, when Y and ZSM-5 zeolites with medium to high silicon-to-aluminum ratios are synthesized, it is conventionally necessary to add chemical agents as a supplementary silicon source to adjust the silicon-to-aluminum ratio of the molecular sieve. The natural aluminosilicate minerals as used are subjected to activation treatment in a sub-molten salt system in the present invention, and thus the $AlO_6$ octahedral layers and $SiO_4$ tetrahedral layers in the natural aluminosilicate minerals can be completely destroyed at a lower temperature (which is 200-350° C.). The natural aluminosilicate minerals as thus obtained have a very high activity for chemical reactions, and thus the problems caused by the high-temperature calcination can be avoided.

In the above preparing method, preferably, when used, the diatomaceous earth, white carbon black may be subjected to activation treatment via the sub-molten salt or the thermal treatment activation. The thermal treatment activation for diatomaceous earth or white carbon black may be carried out by calcinating the diatomaceous earth or white carbon black at 600-1000° C. for 2-6 hours, preferably, at 600-800° C. for 3-5 hours. The sub-molten salt activation for diatomaceous earth or white carbon black may be carried out by mixing the diatomaceous earth or white carbon black with an alkaline substance and deionized water at a mass ratio of 1:0.5-3.5:1-15, and then baking the mixture at 100-350° C. for 2-6 hours; preferably, the sub-molten salt activation for diatomaceous earth or white carbon black may be carried out by mixing the diatomaceous earth or white carbon black with an alkaline substance and deionized water at a mass ratio of 1:1.0-2.5:3-10, and then baking the mixture at 200-300° C. for 2-6 hours.

In the above preparing method, preferably, when used, the kaolin, rectorite, montmorillonite, illite, perlite, bentonite may be subjected to activation treatment via the sub-molten salt activation. The sub-molten salt activation for kaolin, rectorite, montmorillonite, illite, perlite, bentonite may be carried out by mixing the kaolin, rectorite, montmorillonite, illite, perlite or bentonite with an alkaline substance and deionized water at a mass ratio of 1:0.5-3.5:1-15, and then baking the mixture at 100-350° C. for 2-6 hours; preferably, the sub-molten salt activation for kaolin, rectorite, montmorillonite, illite, perlite, bentonite may be carried out by mixing the kaolin, rectorite, montmorillonite or illite with an alkaline substance and deionized water at a mass ratio of 1:1.0-2.5:2-10, and then baking the mixture at 200-300° C. for 2-6 hours.

In the above preparing method, preferably, during the sub-molten salt activation, the alkaline substance as used includes one of sodium hydroxide, potassium hydroxide, sodium carbonate, potassium carbonate and the like, or combinations of more than one members thereof.

In the above preparing method, preferably, the crystal seed as used is a mordenite molecular sieve.

In the above preparing method, preferably, the templating agent as used is one of tetraethylammonium bromide (TEABr), tetrapropylammonium bromide (TPABr), triethanol amine, diethanol amine, caprolactam and the like, or combinations of more than one members thereof.

In the above preparing method, preferably, the hydrothermal crystallization for the aged reaction mixture is carried out using a two-stage crystallization having firstly a pre-crystallization at 100-120° C. for 24-48 hours and then a crystallization at 170-190° C. for 24-48 hours.

In the above preparing method, preferably, the inorganic acid for adjusting pH includes one of sulfuric acid, hydrochloric acid, nitric acid and the like, or combinations of more than one members thereof.

The present invention also provides a mordenite which is prepared by the method for preparing a mordenite as above described, wherein the mordenite has a relative crystallinity of 80%-110% and a silicon-to-aluminum ratio of 5-35. The silicon-to-aluminum ratio of the mordenite as prepared can be adjusted by regulating the ratio of the natural aluminosilicate and silicate minerals as used.

The method for preparing a mordenite provided in the present invention enlarges available sources of raw materials for a molecular sieve. The total silicon source and aluminum source required for the synthesis of a molecular sieve can be provided with the natural aluminosilicate and silicate minerals activated by a thermal treatment or sub-molten salt activation treatment as raw materials, without adding additional chemical silicon and/or aluminum agents. The method thus has a low cost and a simple process route, and can largely reduce the cost for synthesizing a molecular sieve.

DETAILED DESCRIPTION OF PREFERRED EMBODIMENTS

The technical solutions in the present invention are further described in detail in order to provide more explicit understandings of technical features, objectives and beneficial effects of the present invention, which cannot be construed as limitations for the implementable scopes of the present invention.

In the Examples, the natural aluminosilicate and silicate minerals in raw materials for synthesizing a molecular sieve are of industrial grade, while other chemical raw materials are of reagent grade. The relative crystallinity as mentioned in the Examples is a ratio, expressed in percentage, of sum of characteristic peak areas in the XRD pattern at 2θ=6.51°, 9.77°, 13.45°, 22.20°, 25.63°, 26.25° and 27.67° of the obtained product to sum of those of a mordenite standard sample, which is a commercial mordenite (a mordenite from the Catalyst Plant of Nankai University, Tianjin) as synthesized with conventional chemical agents as raw materials, and having a crystallinity of 100% as defined.

In the Examples, the data of XRD is measured by a Bruck AXS D8 Advance type X-ray diffractometer from Germany, and the SEM images are obtained by a FEI Quanta 200F field emission scanning electron microscope from Holland.

Example 1

This example provides a method for preparing a mordenite, wherein the used diatomaceous earth having main components of 93.6 wt % of $SiO_2$ and 3.2 wt % of $Al_2O_3$, rectorite having main components of 41.3 wt % of $SiO_2$ and 38.2 wt % of $Al_2O_3$, kaolin having main components of 50.5 wt % of $SiO_2$ and 44.6 wt % of $Al_2O_3$, montmorillonite having main components of 61.5 wt % of $SiO_2$ and 18.2 wt % of $Al_2O_3$, and illite having main components of 60.9 wt % of $SiO_2$ and 24.8 wt % of $Al_2O_3$, are all commercially available.

The method for preparing a mordenite is carried out according to steps as below:

baking the diatomaceous earth as commercially available to dryness and crushing it into powders, weighing 50.00 g of the diatomaceous earth powders and calcinating them at 800° C. for 4 hours to obtain an thermal activated diatomaceous for use;

baking the rectorite as commercially available to dryness and crushing it into powders, weighing 10.00 g of the rectorite powders, mixing them with 15.00 g of solid sodium hydroxide uniformly, adding thereto 75.00 g of deionized water and baking the resultant to dryness at 250° C. for 4 hours to obtain a sub-molten salt activated rectorite for use;

weighing 4.2 g of solid TEABr and dissolving it into 10 g of deionized water to obtain a TEABr solution for use;

weighing 10 g of a concentrated sulfuric acid with a mass percentage of 98%, adding it to 40 g of deionized water, and cooling the solution to room temperature, for use;

weighing, separately, 6.0 g of the diatomaceous earth powders activated by thermal treatment, 2.2 g of the rectorite powders activated by sub-molten salt activation method, 1.6 g of solid sodium hydroxide, and the above TEABr solution, adding them to 50 g of deionized water and adjusting the pH by the sulfuric acid solution to have a pH of 12.5 to obtain a reaction mixture having a composition by mole of $18SiO_2:Al_2O_3:6.3Na_2O:4.1TEABr:540H_2O$;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain the mordenite.

Figure 1:
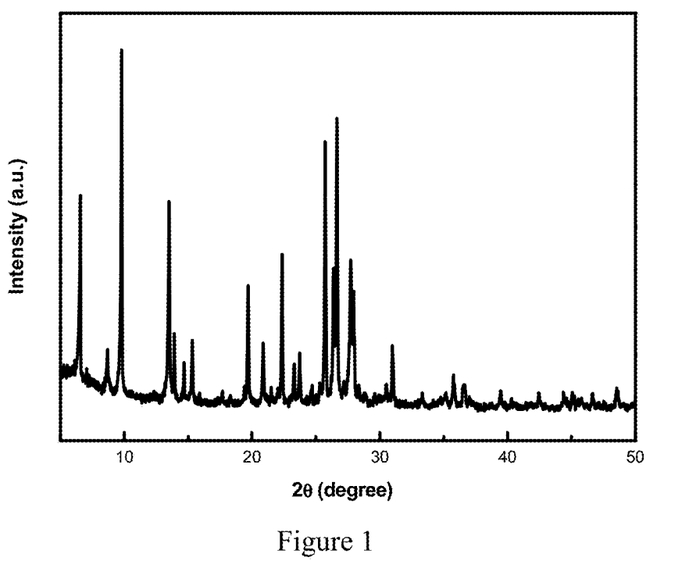
FIG. 1 is a X-ray diffraction (XRD) pattern of the mordenite as prepared in Example 1.
Figure 2:
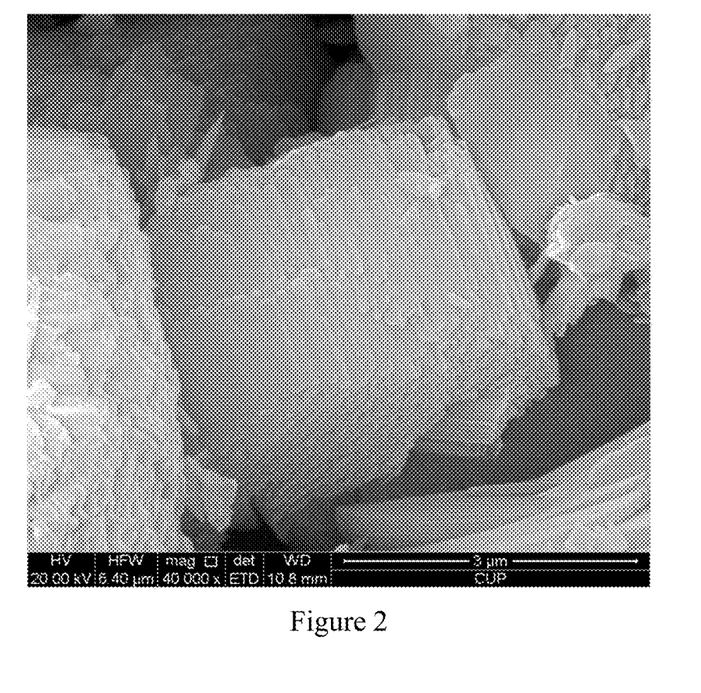
FIG. 2 is an scanning electron microscope (SEM) image of the mordenite as prepared in Example 1.

The product mordenite has a relative crystallinity of 110% and a silicon-to-aluminum ratio of 12, and the XRD pattern and SEM images thereof are shown in FIGS. 1 and 2, respectively.

Example 2

This example provides a method for preparing a mordenite, wherein the diatomaceous earth and the process for thermal activation thereof, and the processes for preparing the TEABr solution and the sulfuric acid solution are the same as those in the Example 1.

The method for preparing a mordenite is carried out according to steps as below:

baking the rectorite as commercially available to dryness and crushing it into powders, weighing 10.00 g of the rectorite powders, mixing them with 25.00 g of solid sodium hydroxide uniformly, adding thereto 125.00 g of deionized water and baking the resultant to dryness at 250° C. for 5 hours to obtain a sub-molten salt activated rectorite for use;

weighing, separately, 6.0 g of the diatomaceous earth powders activated by thermal treatment, 3.5 g of the above rectorite powders activated by sub-molten salt activation method, and the TEABr solution, adding them to 50 g of deionized water and adjusting the pH by the sulfuric acid solution to have a pH of 13 to obtain a reaction mixture having a composition by mole of $18SiO_2:Al_2O_3:6.3Na_2O:4.1TEABr:540H_2O$;

aging the reaction mixture at 70° C. for 24 hours before transferring it to a stainless-steel kettle for crystallization with a polytetrafluoroethylene liner, subjecting it to a pre-crystallization at 100° C. for 24 hours and then a static crystallization at 170° C. for 36 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain the mordenite.

Figure 3:
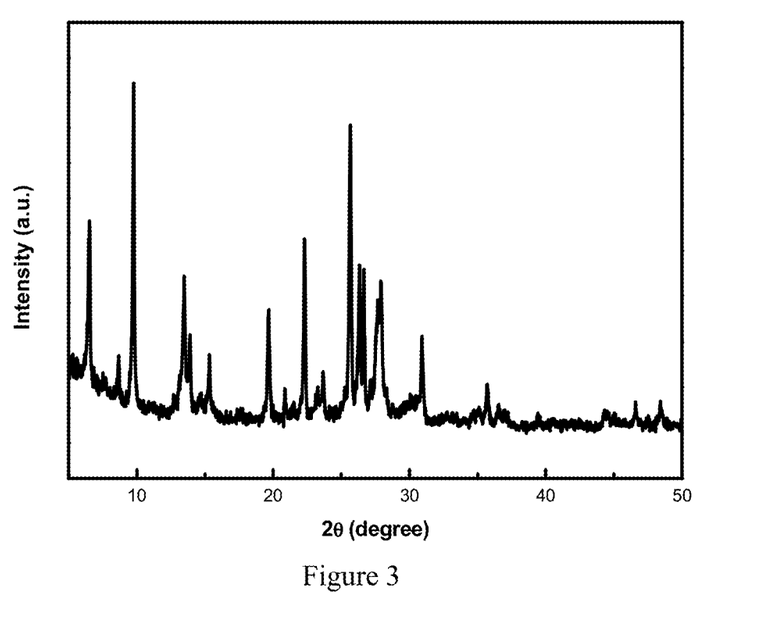
FIGS. 3 to 12 are XRD patterns of the mordenites as prepared in Examples 2 to 11, respectively.

The product mordenite has a relative crystallinity of 102% and a silicon-to-aluminum ratio of 11, and the XRD pattern thereof is shown in FIG. 3.

Example 3

This example provides a method for preparing a mordenite, wherein the processes for activating diatomaceous earth and rectorite, and the processes for preparing the TEABr solution and the sulfuric acid solution are the same as those in the Example 1.

The method for preparing a mordenite is carried out according to steps as below:

weighing, separately, 6.0 g of the diatomaceous earth powders activated by thermal treatment, 0.5 g of the rectorite powders activated by sub-molten salt activation method, 2.4 g of solid sodium hydroxide, and the above TEABr solution, adding them to 50 g of deionized water and adjusting the pH by the sulfuric acid solution to have a pH of 13 to obtain a reaction mixture having a composition by mole of $35SiO_2:Al_2O_3:12.2Na_2O:8TEABr:1050H_2O$;

aging the reaction mixture at 70° C. for 24 hours before transferring it to a stainless-steel kettle for crystallization with a polytetrafluoroethylene liner, subjecting it to a pre-crystallization at 110° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain the mordenite.

Figure 4:
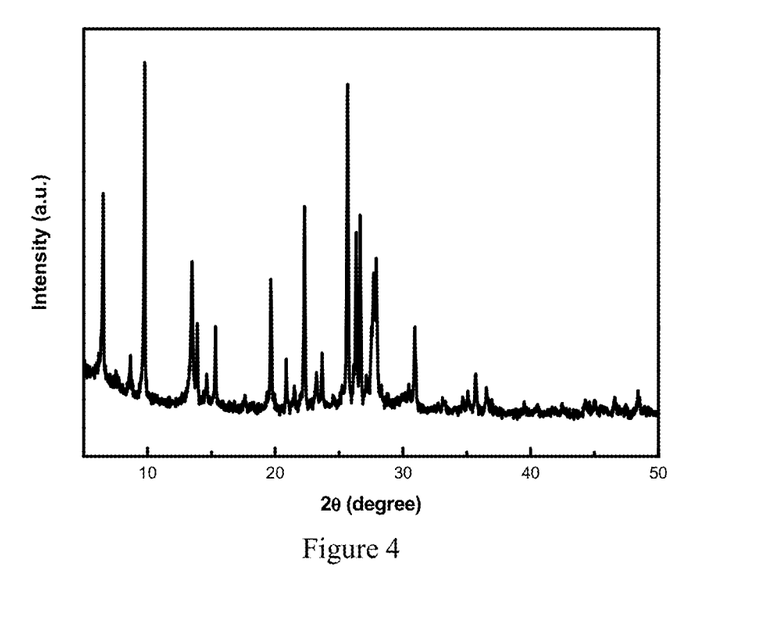

The mordenite has a relative crystallinity of 97% and a silicon-to-aluminum ratio of 26, and the XRD pattern thereof is shown in FIG. 4.

Example 4

This example provides a method for preparing a mordenite, wherein the processes for activating diatomaceous earth and rectorite, and the processes for preparing the sulfuric acid solution are the same as those in the Example 1.

The method for preparing a mordenite is carried out according to steps as below:

weighing 2.0 g of solid TEABr and dissolving it into 10 g of deionized water to obtain a TEABr solution for use;

weighing, separately, 2.8 g of the diatomaceous earth powders activated by thermal treatment, 1.0 g of the rectorite powders activated by sub-molten salt activation method, 0.75 g of solid sodium hydroxide, and the above TEABr solution, adding them to 50 g of deionized water and adjusting the pH by the sulfuric acid solution to have a pH of 11 to obtain a reaction mixture having a composition by mole of $18SiO_2:Al_2O_3:6.3Na_2O:4.1TEABr:1260H_2O$;

aging the reaction mixture at 40° C. for 24 hours before transferring it to a stainless-steel kettle for crystallization with a polytetrafluoroethylene liner, subjecting it to a pre-crystallization at 100° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain the mordenite.

Figure 5:
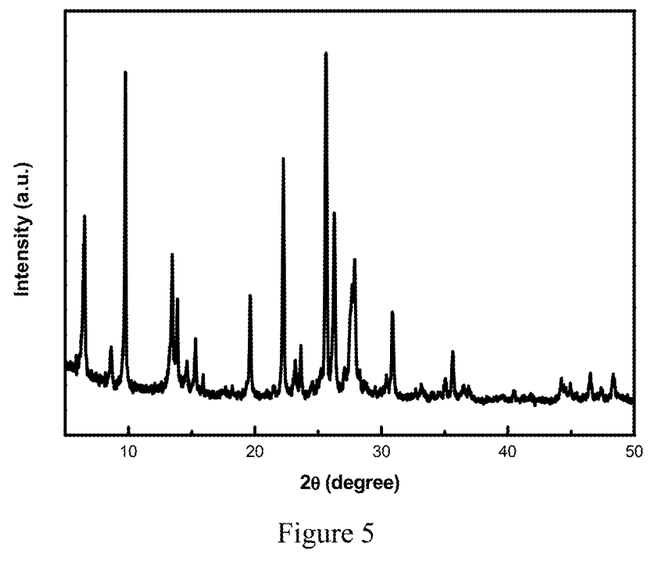

The mordenite has a relative crystallinity of 88% and a silicon-to-aluminum ratio of 10, and the XRD pattern thereof is shown in FIG. 5.

Example 5

This example provides a method for preparing a mordenite, wherein the processes for activating diatomaceous earth and rectorite, and the process for preparing the sulfuric acid solution are the same as those in the Example 1.

The method for preparing a mordenite is carried out according to steps as below:

weighing, separately, 6.0 g of the diatomaceous earth powders activated by thermal treatment, 2.2 g of the activated rectorite powders by sub-molten salt activation method, 1.6 g of solid sodium hydroxide, and 4.6 g of triethanol amine (TEA), adding them to 60 g of deionized water and adjusting the pH by the sulfuric acid solution to have a pH of 12.5 to obtain a reaction mixture having a composition by mole of $18SiO_2:Al_2O_3:6.3Na_2O:5.4TEA:540H_2O$;

aging the reaction mixture at 55° C. for 24 hours before transferring it to a stainless-steel kettle for crystallization with a polytetrafluoroethylene liner, subjecting it to a pre-crystallization at 120° C. for 24 hours and then a static crystallization at 170° C. for 36 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain the mordenite.

Figure 6:
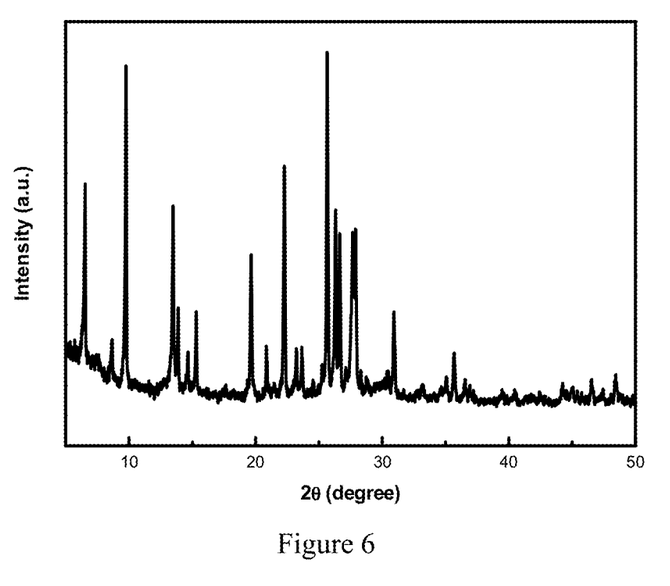

The mordenite has a relative crystallinity of 103% and a silicon-to-aluminum ratio of 12, and the XRD pattern thereof is shown in FIG. 6.

Example 6

This example provides a method for preparing a mordenite, wherein the processes for activating diatomaceous earth and rectorite, and the process for preparing the sulfuric acid solution are the same as those in the Example 1.

The method for preparing a mordenite is carried out according to steps as below:

weighing, separately, 6.0 g of the diatomaceous earth powders activated by thermal treatment, 2.2 g of the rectorite powders activated by sub-molten salt activation method, 1.6 g of solid sodium hydroxide, and 0.7 g of crystal seed for mordenite (as manufactured by Catalyst Plant of Nankai University), adding them to 60 g of deionized water and adjusting the pH by the sulfuric acid solution to have a pH of 12 to obtain a reaction mixture having a composition by mole of $18SiO_2:Al_2O_3:6.3Na_2O:540H_2O$, wherein the amount of the crystal seed is 1.0 wt % based on the total weight of the reaction mixture;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 40 hours;

upon the completion of crystallization, cooling and filtering the reaction product to remove mother liquor, washing it to have a neutral pH, drying it at 120° C. for 24 hours to obtain a crystallized product which is measured by XRD to have a phase pertaining to mordenite.

Figure 7:
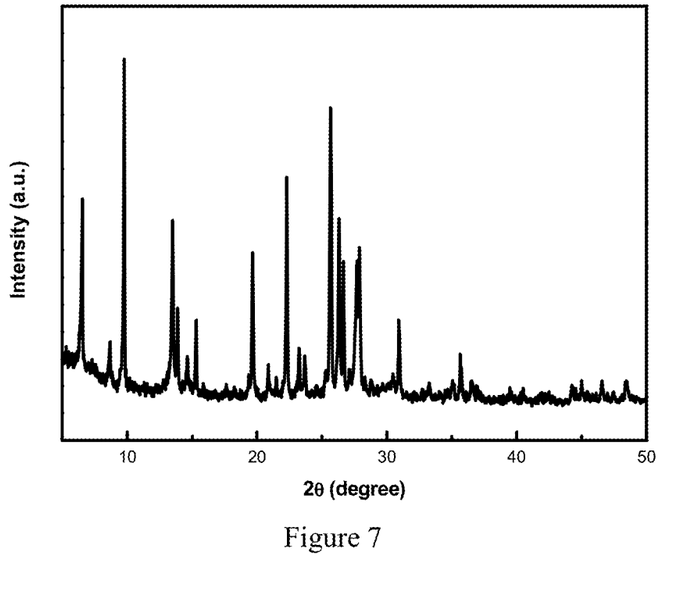

The mordenite has a relative crystallinity of 90% and a silicon-to-aluminum ratio of 13, and the XRD pattern thereof is shown in FIG. 7.

Example 7

This example provides a method for preparing a mordenite, wherein the processes for activating diatomaceous earth and rectorite, and the process for preparing the sulfuric acid solution are the same as those in the Example 1.

The method for preparing a mordenite is carried out according to steps as below:

weighing, separately, 6.0 g of the diatomaceous earth powders activated by thermal treatment, 2.2 g of the rectorite powders activated by sub-molten salt activation method, and 1.6 g of solid sodium hydroxide, adding them to 50 g of deionized water and adjusting the pH by the sulfuric acid solution to have a pH of 12.5 to obtain a reaction mixture having a composition by mole of $18SiO_2:Al_2O_3:6.3Na_2O:540H_2O$;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 24 hours;

upon the completion of crystallization, cooling and filtering the reaction product to remove mother liquor, washing it to have a neutral pH, drying it at 120° C. to obtain a crystallized product which is measured by XRD to have a phase pertaining to mordenite.

Figure 8:
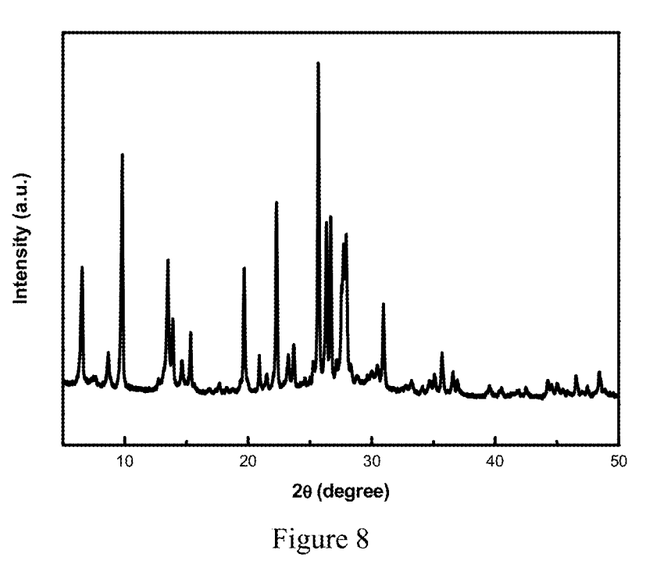

The product mordenite has a relative crystallinity of 86% and a silicon-to-aluminum ratio of 10, and the XRD pattern thereof is shown in FIG. 8.

Example 8

This example provides a method for preparing a mordenite, wherein the process for activating diatomaceous earth, and the process for preparing the sulfuric acid solution are the same as those in the Example 1.

The method for preparing a mordenite is carried out according to steps as below:

weighing 3.5 g of solid TEABr and dissolving it into 10 g of deionized water to obtain a TEABr solution for use;

baking the kaolin as commercially available to dryness and crushing it into powders, weighing 10.00 g of the kaolin powders, mixing them with 14.00 g of solid sodium hydroxide uniformly, adding thereto 70.00 g of deionized water and baking the resultant to dryness at 200° C. for 6 hours to obtain a sub-molten salt activated kaolin for use;

weighing, separately, 4.0 g of the diatomaceous earth powders activated by thermal treatment, 0.95 g of the kaolin powders activated by sub-molten salt activation method, 1.1 g of solid sodium hydroxide, and the above TEABr solution, adding them to 50 g of deionized water and adjusting the pH by the sulfuric acid solution to have a pH of 12.5 to obtain a reaction mixture having a composition by mole of $20SiO_2$:$Al_2O_3$:$7Na_2O$:$4.6TEABr$:$1000H_2O$;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain a product which is measured by XRD to have a phase pertaining to mordenite.

Figure 9:
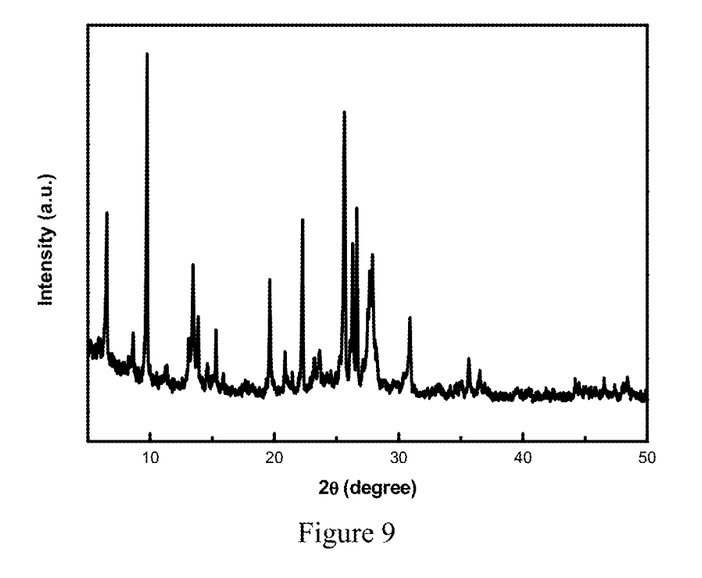

The mordenite has a relative crystallinity of 104% and a silicon-to-aluminum ratio of 18, and the XRD pattern thereof is shown in FIG. 9.

Example 9

This example provides a method for preparing a mordenite, wherein the process for activating diatomaceous earth, and the process for preparing the sulfuric acid solution are the same as those in Example 1. The process for preparing the TEABr solution is the same as that in Example 8.

The method for preparing a mordenite is carried out according to steps as below:

baking the montmorillonite as commercially available to dryness and crushing it into powders, weighing 10.00 g of the montmorillonite powders, mixing them with 15.00 g of solid sodium hydroxide uniformly, adding thereto 75.00 g of deionized water and baking the resultant to dryness at 250° C. for 5 hours to obtain a sub-molten salt activated montmorillonite for use;

weighing, separately, 4.0 g of the diatomaceous earth powders activated by thermal treatment, 3.0 g of the montmorillonite powders activated by sub-molten salt activation method, 0.05 g of solid sodium hydroxide, and the TEABr solution, adding them to 60 g of deionized water and adjusting the pH by the sulfuric acid solution to have a pH of 12.5 to obtain a reaction mixture having a composition by mole of $20SiO_2$:$Al_2O_3$: $7Na_2O$:$4.6TEABr$:$1000H_2O$;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain a product which is measured by XRD to have a phase pertaining to mordenite.

Figure 10:
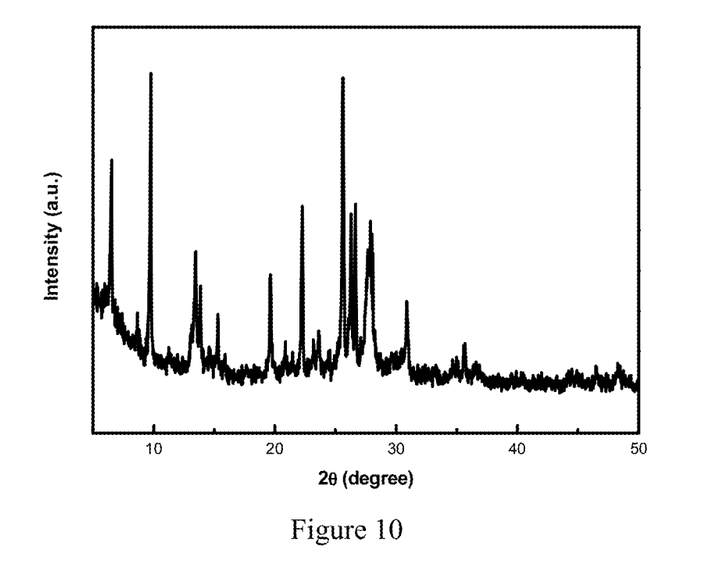

The mordenite has a relative crystallinity of 98% and a silicon-to-aluminum ratio of 15, and the XRD pattern thereof is shown in FIG. 10.

Example 10

This example provides a method for preparing a mordenite, wherein the process for activating diatomaceous earth, and the process for preparing the sulfuric acid solution are the same as those in Example 1. The process for preparing the TEABr solution is the same as that in Example 8.

The method for preparing a mordenite is carried out according to steps as below:

baking the illite as commercially available to dryness and crushing it into powders, weighing 10.00 g of the illite powders, mixing them with 15.00 g of solid sodium hydroxide uniformly, adding thereto 75.00 g of deionized water and baking the resultant to dryness at 250° C. for 4 hours to obtain a sub-molten salt activated illite for use;

weighing, separately, 4.0 g of the diatomaceous earth powders activated by thermal treatment, 1.98 g of the illite powders activated by sub-molten salt activation method, 0.6 g of solid sodium hydroxide, and the TEABr solution, adding them to 55 g of deionized water and adjusting the pH by the sulfuric acid solution to have a pH of 12.5 to obtain a reaction mixture having a composition by mole of $20SiO_2$:$Al_2O_3$:$7Na_2O$:$4.6TEABr$:$1000H_2O$;

aging the reaction mixture at 70° C. for 24 hours before transferring it to a stainless-steel kettle for crystallization with a polytetrafluoroethylene liner, subjecting it to a pre-crystallization at 120° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain a product which is measured by XRD to have a phase pertaining to mordenite.

Figure 11:
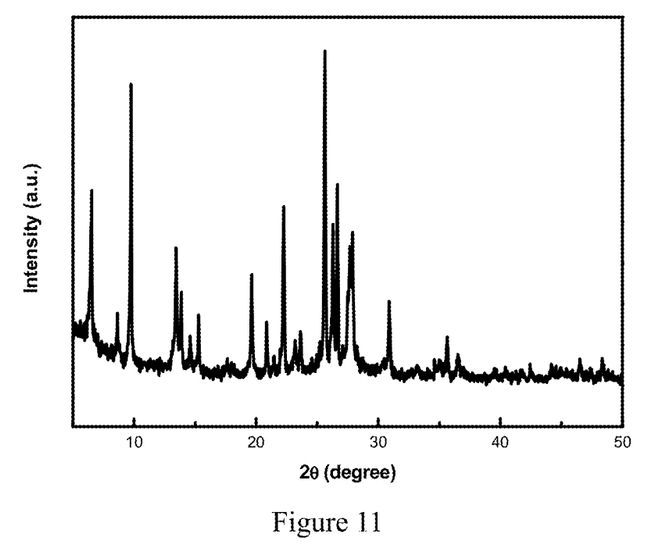

The mordenite has a relative crystallinity of 95% and a silicon-to-aluminum ratio of 14, and the XRD pattern thereof is shown in FIG. 11.

Example 11

This example provides a method for preparing a mordenite, wherein the processes for activating diatomaceous earth and rectorite, and the process for preparing the sulfuric acid solution are the same as those in Example 1. The process for activating kaolin and the process for preparing the TEABr solution are the same as those in Example 8.

The method for preparing a mordenite is carried out according to steps as below:

weighing, separately, 5.0 g of the diatomaceous earth powders activated by thermal treatment, 0.65 g of the rectorite powders activated by sub-molten salt activation method, 0.5 g of the kaolin powders activated by sub-molten salt activation method, 1.2 g of solid sodium hydroxide, and the TEABr solution, adding them to 50 g of deionized water and adjusting the pH by the sulfuric acid solution to have a pH of 12.5 to obtain a reaction mixture having a composition by mole of $23\ SiO_2$:$Al_2O_3$: $6.2Na_2O$:$4.1TEABr$:$1000H_2O$;

aging the reaction mixture at 70° C. for 24 hours before transferring it to a stainless-steel kettle for crystallization with a polytetrafluoroethylene liner, subjecting it to a pre-crystallization at 110° C. for 24 hours and then a static crystallization at 170° C. for 48 hours;

upon the completion of crystallization, cooling and filtering the reaction product to remove mother liquor, washing it to have a neutral pH, drying it at 120° C. for 24 hours and then calcinating the resultant as obtained in a muffle furnace at 550° C. for 10 hours to remove the templating agent, so as to obtain a product which is measured by XRD to have a phase pertaining to mordenite.

Figure 12:
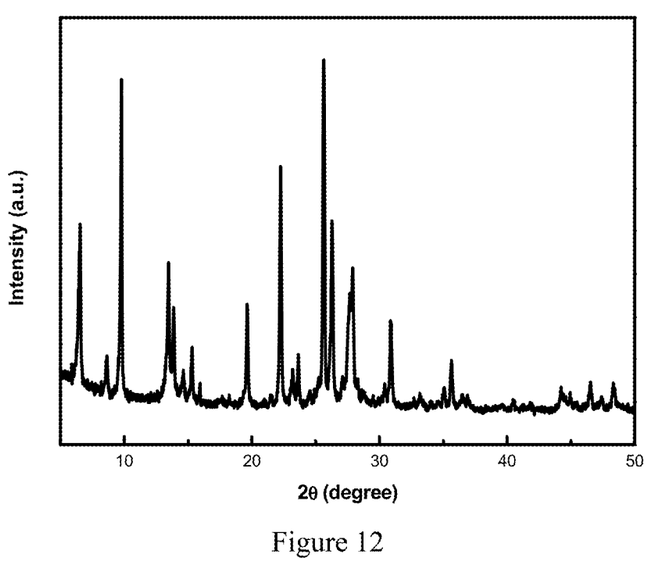

The mordenite has a relative crystallinity of 98% and a silicon-to-aluminum ratio of 20, and the XRD pattern thereof is shown in FIG. 12.

The invention claimed is:

1. A method for preparing a mordenite, which is a method for preparing the mordenite through a hydrothermal crystallization by using natural aluminosilicate and silicate minerals as total silicon sources and total aluminum sources, comprising the steps of:
   subjecting the natural aluminosilicate and silicate minerals to activation treatment which is a sub-molten salt activation and/or a thermal treatment activation;
   selecting and mixing the activated natural aluminosilicate and silicate minerals according to the silicon-to-aluminum ratio of the targeted mordenite, adding thereto deionized water, sodium hydroxide, crystal seed, a templating agent to obtain a reaction mixture having a composition by mole of $SiO_2:Al_2O_3=10\text{-}40:1$, $H_2O:SiO_2=30\text{-}90:1$, $Na_2O:SiO_2=0.1\text{-}0.4:1$, and the templating agent: $SiO_2=0\text{-}0.6:1$, in which the crystal seed is added in amount of 0-10 wt % based on the total mass of the reaction mixture;
   adjusting the reaction mixture by using an inorganic acid to have a pH of 10-13, and then aging it at 40-80° C. for 6-24 hours; and
   where the templating agent is not added, subjecting the aged reaction mixture to hydrothermal crystallization, and then filtering, washing and drying the crystallized product to obtain the mordenite; and where the templating agent is added, subjecting the aged reaction mixture to hydrothermal crystallization, and then filtering, washing, drying and calcinating the crystallized product to obtain the mordenite.

2. The method for preparing a mordenite according to claim 1, wherein the natural aluminosilicate minerals include one of kaolin, rectorite, montmorillonite, illite, perlite and bentonite, or combinations of more than one members thereof, and the natural silicate minerals include one of diatomaceous earth and white carbon black, or combinations thereof, wherein the one of diatomaceous earth and white carbon black, or combinations thereof are used as a portion of the silicon sources, and the one of kaolin, rectorite, montmorillonite, illite, perlite and bentonite, or combinations of more than one members thereof are used as a portion of the silicon sources and total aluminum sources.

3. The method for preparing a mordenite according to claim 2, wherein the diatomaceous earth, white carbon black are subjected to activation treatment via the sub-molten salt activation or the thermal treatment activation method;
   the thermal treatment activation for diatomaceous earth, white carbon black is carried out by calcinating the diatomaceous earth or white carbon black at 600-1000° C. for 2-6 hours; and
   the sub-molten salt activation for diatomaceous earth, white carbon black is carried out by mixing the diatomaceous earth or white carbon black with an alkaline substance and deionized water at a mass ratio of 1:0.5-3.5:1-15, and then baking the mixture at 100-350° C. for 2-6 hours.

4. The method for preparing a mordenite according to claim 3, wherein the kaolin, rectorite, montmorillonite, illite, perlite, bentonite are subjected to activation treatment via the sub-molten salt activation;
   the sub-molten salt activation for kaolin, rectorite, montmorillonite, illite, perlite, bentonite is carried out by mixing the kaolin, rectorite, montmorillonite, illite, perlite or bentonite with an alkaline substance and deionized water at a mass ratio of 1:0.5-3.5:1-15, and then baking the mixture at 100-350° C. for 2-6 hours.

5. The method for preparing a mordenite according to claim 4, wherein the alkaline substance includes one of sodium hydroxide, potassium hydroxide, sodium carbonate and potassium carbonate, or combinations of more members thereof.

6. The method for preparing a mordenite according to claim 3, wherein the alkaline substance includes one of sodium hydroxide, potassium hydroxide, sodium carbonate and potassium carbonate, or combinations of more members thereof.

7. The method for preparing a mordenite according to claim 2, wherein the kaolin, rectorite, montmorillonite, illite, perlite, bentonite are subjected to activation treatment via the sub-molten salt activation;
   the sub-molten salt activation for kaolin, rectorite, montmorillonite, illite, perlite, bentonite is carried out by mixing the kaolin, rectorite, montmorillonite, illite, perlite or bentonite with an alkaline substance and deionized water at a mass ratio of 1:0.5-3.5:1-15, and then baking the mixture at 100-350° C. for 2-6 hours.

8. The method for preparing a mordenite according to claim 7, wherein the alkaline substance includes one of sodium hydroxide, potassium hydroxide, sodium carbonate and potassium carbonate, or combinations of more members thereof.

9. The method for preparing a mordenite according to claim 1, wherein the crystal seed is a mordenite molecular sieve.

10. The method for preparing a mordenite according to claim 1, wherein the templating agent is one of tetraethylammonium bromide (TEABr), tetrapropylammonium bromide (TPABr), triethanol amine, diethanol amine and caprolactam, or combinations of more members thereof.

11. The method for preparing a mordenite according to claim 1, wherein the hydrothermal crystallization is carried out using a two-stage crystallization having firstly a pre-crystallization at 100-120° C. for 24-48 hours and then a crystallization at 170-190° C. for 24-48 hours.

12. The method for preparing a mordenite according to claim 1, wherein the inorganic acid includes one of sulfuric acid, hydrochloric acid and nitric acid, or combinations of more members thereof.

13. A mordenite which is prepared by the method for preparing a mordenite according to claim 1, wherein the mordenite has a relative crystallinity of 80%-110% and a silicon-to-aluminum ratio of 5-35.

* * * * *